Figure 1:
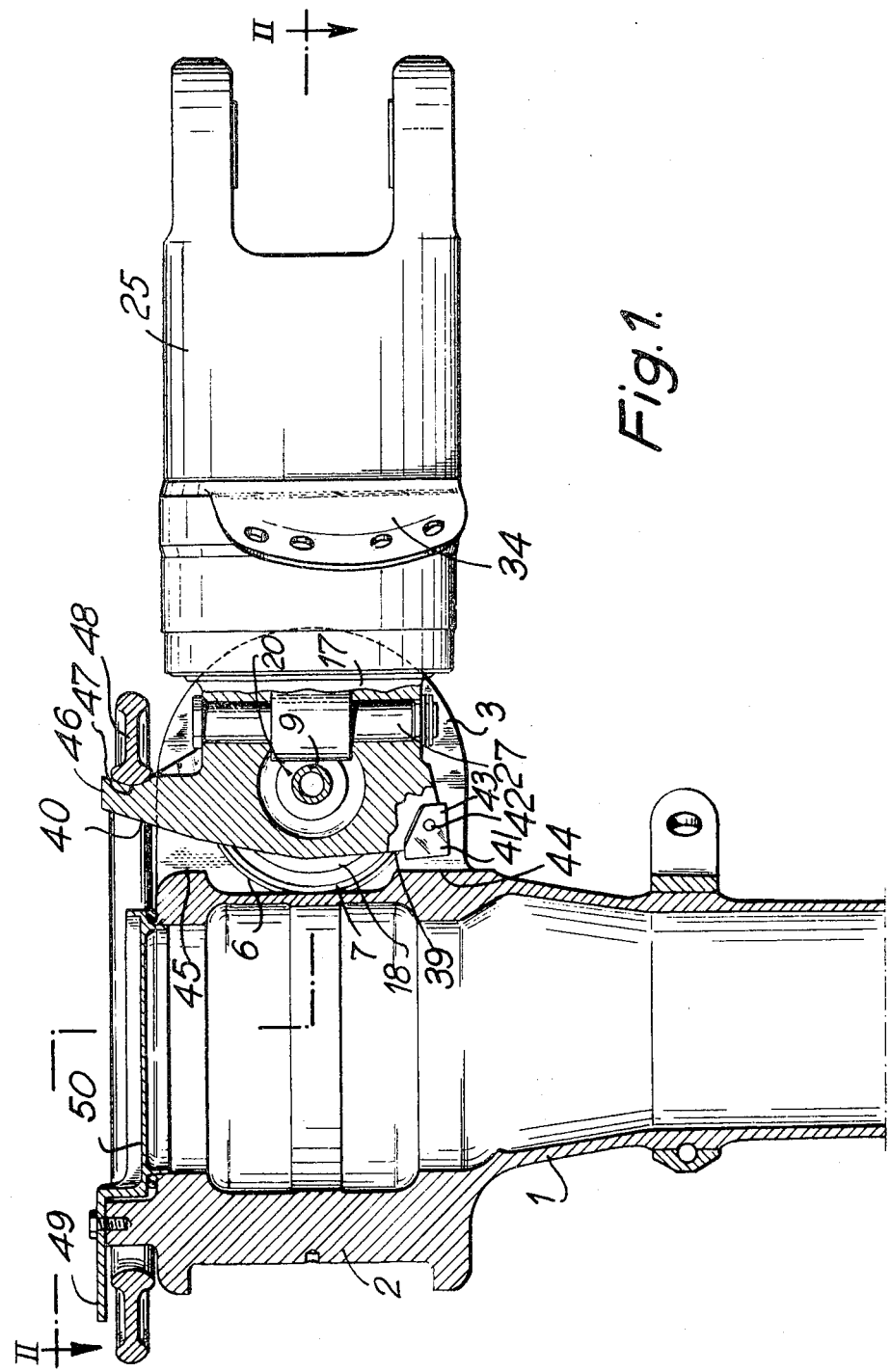

United States Patent
Mouille

[15] 3,679,322
[45] July 25, 1972

[54] ROTOR HUBS ON ROTARY WING AIRCRAFT

[72] Inventor: Rene Louis Mouille, Bouches-Du-Rhone, France

[73] Assignee: Societe Nationale Industrielle Aerospatiale, Paris, France

[22] Filed: May 27, 1970

[21] Appl. No.: 40,823

[30] Foreign Application Priority Data
May 28, 1969 France..................................6917323

[52] U.S. Cl..............................416/141, 416/138, 416/114
[51] Int. Cl........................................................B64c 27/40
[58] Field of Search..................416/131, 135, 140, 141, 98, 416/112–115, 138, 139

[56] References Cited

UNITED STATES PATENTS

| | | | |
|---|---|---|---|
| 2,511,687 | 6/1950 | Andrews | 416/112 |
| 2,614,640 | 10/1952 | Buivid | 416/140 |
| 3,232,349 | 2/1966 | Ballauer | 416/144 X |
| 3,322,200 | 5/1967 | Tresch | 416/131 X |
| 3,520,637 | 7/1970 | Tobey | 416/135 |

*Primary Examiner*—Everette A. Powell, Jr.
*Attorney*—Waters, Roditi, Schwartz & Nissen

[57] ABSTRACT

The invention relates to a rotor hub for rotary-wing aircraft, in which a hollow one-piece rotor hub-mast is provided at its upper end with lobes lying in planes parallel to the rotation axis of the rotor hub-mast, pairs of such lobes forming yokes for respectively receiving a flapping hinge-pin for the associated blade.

4 Claims, 2 Drawing Figures

ROTOR HUBS ON ROTARY WING AIRCRAFT

The technical province of this invention is that of aeronautical engineering, and more specifically therein the invention relates to lift and propulsion elements, more particularly for rotary-wing aircraft.

It is already known to provide the rotor of a rotary-wing aircraft with various hinges to enable the blades to move about their respective drag, flapping and pitch axes. Conventional arrangements with flapping and drag hinges lead to complicated mechanical designs which furthermore require frequent maintenance.

It is also known to equip rotary-wing aircraft with lift rotors in which only blade articulations permitting blade pitch variations are provided, and in such cases either the natural elasticity of the component parts themselves or elastic means enable the other articulations to be dispensed with.

Furthermore such rotors usually comprise a rotor shaft proper and a hub provided with blade attachments, said hub being equipped externally with fitted arms. Because such a design invariably involves delicate and costly manufacturing operations and results in heavy assemblies, it has been proposed to overcome this by providing a one-piece rotor mast consisting of a single hollow part forming a shaft, hub and flange at the same time, such parts including rotor blade connecting means having flapping and drag hinges. An arrangement of this kind was described in U.S. Pat. Ser. No. 3,322,200 and in U.S. application Ser. No. 837,539 filed on June 30, 1969 by the applicant.

It has further been proposed to eliminate these hinges in a design comprising a one-piece rotor mast having a plurality of cylindrical arms carrying blade supports which permit only motion for varying the blade pitch but interdict all movement about the drag and flapping axes.

An arrangement of this kind was described in U.S. application Ser. No. 746,852 filed on July 23, 1968.

The present invention relates to a design which overcomes the drawbacks of conventional rotors, in which the hub comprises a triple flapping, drag and pitch-varying articulation and which at the same time retains the advantages of a rigid rotor having only a pitch-varying articulation, which advantages reside primarily in simplicity of design, low weight and relatively low cost. A design of this kind nevertheless retains the advantages of a fully articulated conventional rotor, most notably with respect to low vibration at high speed and the low level of flapping stresses in the blades and the hub, yet without the disadvantages inherent in this type of rotor, to wit:

a. the "grooving" effect, that is to say the formation of imprints by the rolling elements along the anti-friction bearing races loaded by centrifugal force, which bearings are subjected to oscillating motion which reduces their life span, b. and the need to equip such rotors with drag dampers, with blade interconnecting devices performing the same function, or with both.

This invention accordingly relates to a hollow one-piece hub mast which, by way of blade attachments, is provided with double lobes arranged in planes parallel to the hub rotation axis, which double lobes form yokes equal in number to the number of rotor blades.

In accordance with a teaching of this invention, each of said yokes receives the ends, shaped as flapping hinge-pins, of the shoulder portions of a stub-axle the body of which carries a sleeve rotating on said stub-axle and rigidly connected to a blade. Preferably, each blade possesses a degree of flexibility in its own plane that permits the motions induced in flight by the flapping motion.

With such an arrangement the elements working in the plane of the rotor and forming tailed-in attachments for drag motion possess great resistance to alternating loads in said plane for the following reasons:

a. A design of this kind makes it possible to adopt for the needle bearings housed in the yoke flanges a maximum diameter and width compatible with assembly of the said shoulder portions on the corresponding stub-axle body, as well as maximum spacing between the two bearings used for the flapping hinge.

b. Each stub-axle and its two shoulder portions form a very rigid one-piece unit because the critical joint area between the shoulder portions and the body is reinforced since it can be generously dimensioned, as a result of which the stresses therein can be reduced to a level below the fatigue limit, thereby making it possible to give the part an unlimited life span.

c. The lobes can be designed so that they are as close as possible to the hub axis, thereby making it possible to reduce their weight while at the same time retaining cross-sections insuring a low stress level in the lobes consistent with good fatigue strength.

d. Fetching the flapping axis closer to the rotor axis results in a notable reduction in the rotor driving loads.

Apart from the great flexibility of the blades of such a rotor in their own plane, it is necessary, in order to achieve satisfactory overall operation, to furthermore so adjust the natural vibration frequencies of the blades as to reduce the dynamic stresses to which they are subjected.

It is accordingly a further teaching of this invention that the stub-axle constitutes an attachment point, on the flapping hinge side, for inextensible but torsionally flexible elements for connection to a reaction member for a blade supporting sleeve whereby to absorb the centrifugal loads.

Further, the existence of a flapping hinge requires the provision of an anti-coning stop which is formed in accordance with this invention by cooperation between catch members projecting on the inner regions of the stub-axles, preferably at the top of the hub, and a ring providing mutual and reciprocal action on the blades, operating in tension, and located in the same region. An arrangement of this kind is advantageous by virtue both of its low cost and low weight.

The hinges can be lubricated in the manner well known per se with grease or oil, and in the latter event preferably by means of a visible-level reservoir and suitable flexible lines.

The method of mounting such a hub mast on the main transmission box of the helicopter, of mounting the blade attachment sleeves on the stub-axles and of fixing the flexible elements on the blade attachment end, as well as the swashplate control system, can be identical to those described in the aforesaid U.S. application Ser. No. 746,852 filed July 23, 1968 and in U.S. application Ser. No. 871,934 filed Oct. 28, 1969 and relating thereto.

The description which follows with reference to the accompanying non-limitative exemplary drawings will give a clear understanding of how the invention can be carried into practice.

Figure 2:
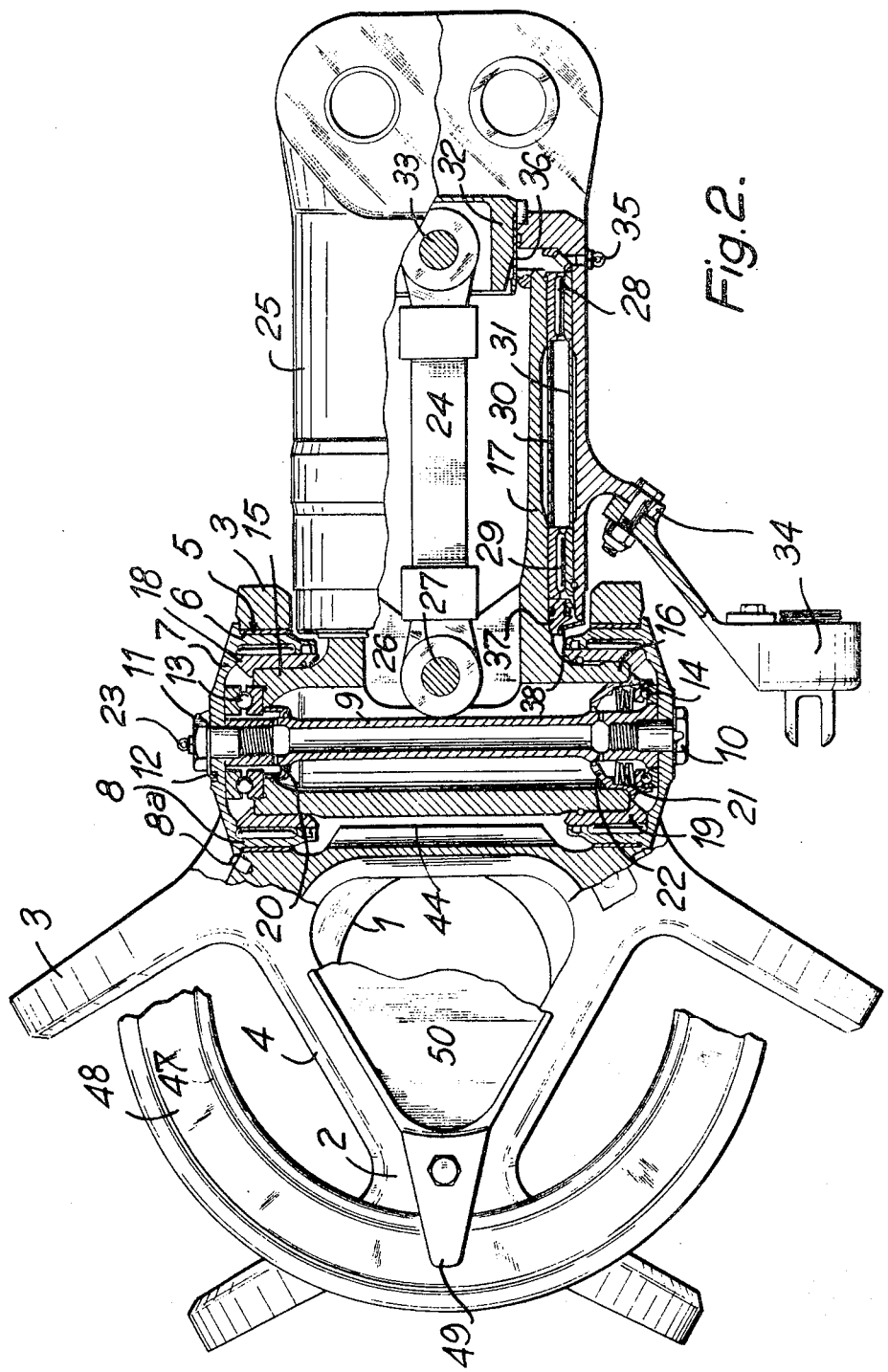

In the drawings:

FIG. 1 shows in partial cutaway a side elevation view of a rotor hub devoid of drag hinges; and FIG. 2 is a plan view, likewise with cutaway portions, corresponding to FIG. 1.

In the exemplary illustrated embodiment, the design includes a hub mast 1 formed by a hollow one-piece body the reinforced head 2 of which comprises three external lateral yokes each formed by pairs of lobes 3. At the level of the reinforced portion, the spaces between each pair of lobes 3 produces a configuration which may be likened to an equilateral triangular prism 4, the width of the faces of which is approximately equal to the gap between each pair of lobes 3, the faces of said prism being accordingly as close as possible to the rotation axis of the hub mast. Each lobe 3 is formed with a circular opening 5 the axis of which is perpendicular to the rotation axis of hub mast 1, and each such opening receives, slidably within a hard inserted liner 6, the skirt 8 of a cap 7. The bottom of each cap has a projecting border for bearing against the end of a lodging formed in the outer surface of each lobe, and, by means of a notch in this border, the caps are restrained angularly by cooperation with the conical heads of dogs 8a which are thereby made captive and simultaneously arrest the caps of two associated lobes.

These caps are pulled towards each other, against the ends of a hollow spacer 9, by bolts 10 and 11 which pass through the caps and are restrained thereagainst by their heads and by lockwashers 12. Applied against the cap ends are the races of thrust bearings 13 and 14 which flank the ends of hollow shoulders 15 and 16 which form a flapping hinge-pin on the end of the likewise hollow body 17 of a stub-axle inserted between the lobes 3.

Additionally mounted on these shoulder ends, and restrained by insertion thereinto are the needle-bearing inner races 18 and 19 the needles of which roll along the inner surfaces of the cap skirts.

The inner race of bearing 13 bears against the end of shoulder 15, and an oiltight bell 20 for retaining the lubricant of bearing 13 contacts said inner race.

The inner race of the opposite bearing 14 bears against a stack of spring washers 21, which themselves bear against an inner shoulder of an oiltight bell 22 which is applied against the end-section of the opposite shoulder 16 through an external border formed thereon.

One of the bolts 11 is provided with a grease nipple 23 for filling the void within spacer 19, the latter being formed with holes beneath the bells 20 and 22.

Obviously, O-ring type or lipped seals are provided between the bells and the spacer, between the cap skirts and the outer races of the needle-bearings, and between the cap skirts themselves and the inner races of said needle-bearings, the O-ring seals being used between relatively motionless and the lipped seals between relatively movable elements.

The stub-axle body 17 is hollow and receives the torsionally flexible but inextensible tie member 24 for preventing the associated blade attachment sleeve 25 from being pulled off by centrifugal force. The bottom of the hollow part of the stub-axle accordingly communicates with the hollow part of the shoulders via a slot 26 traversed by a pin 27 which is restrained at one end by a head portion and at the other by a nut, and this pin receives a terminal eye of attachment member 24 inserted into slot 26. The sleeve 25, which is carried on needle-bearings 28 and 29 spaced by bushes 30 and 31 bounding a lubricant reservoir between the outer and inner races, receives a connecting block 32 via a pin 33 at the other end of tie member 24, this assembly being substantially identical to that described in the aforesaid U.S. applications Ser. Nos. 746,852 filed July 23, 1968, and 871,934 filed Oct. 28, 1969. The same applies with regard to assembly of hub mast 1 on the main transmission box of the helicopter and with regard to the rotor blade pitch control, which may be provided by a handle 34 fitted to the side of sleeve 25.

Oiltightness for the needle-bearings 28 and 29 is provided, in respect of a grease nipple 35 provided in the side of sleeve wall 25, proximate the sleeve and which receives block 32, by a seal inside the stub that bears against a fitted liner 36 for receiving block 32, oiltightness at the other end of sleeve 25 being provided by a complex seal 37 in conjunction with a dust cap 38. It is to be noted that the lubrication provided by grease nipples 23 and 35 could be accomplished alternatively by a visible-level oil reservoir in the rotor mast head communicating through flexible lines with unions which replace said grease nipples, neither the reservoir nor the flexible lines being shown in the drawings.

For the purpose of limiting flapping motion of the rotor blades, the stub-axle shoulders are formed in their middles with dihedron-forming machined facets 39 and 40. The lower facet 39 is supplemented by a pair of shoes 41 pivotally mounted on a pin 42 which extends through a boss 43 that projects between indents on the body of the shoulders, which shoes cooperate with a thrust face 44 formed at the bottom of the yoke formed by the lobes 3, between one edge of said face and a central indent.

The upper facet 40 is capable of cooperating directly with a matching thrust facet 45 on the same yoke bottom.

The facet 40 terminates in a finger 46, the stub-proximate portion of which is contoured as at 47 whereby to restrain a rigid ring 48 of dumb-bell cross-section. The ring 48 encompasses the three fingers 46 associated to the three blades of the rotor herein described. Ring 48 is located between the upper faces of the lobes 3 and tapering corners 49 of a triangular restraining plate 50 spigoted and bolted on to the head of hub mast 1.

It is to be noted that stub-axle 17, which is integral with its shoulders 15 and 16, embodies a robust blending zone where the stresses can be reduced to below the fatigue limit in the metal, thus imparting a useful life of no set limit to the part. The relative dimensions of the outer diameter of the shoulders and the inner diameter of the apertures in lobes 3 allows assembly to be carried out by oblique insertion, such assembly being completed from the exterior of the lobes by fitting the anti-friction bearings and the caps and subsequently clamping them in position against the internal spacer 9 by means of bolts 10 and 11.

The maximum proximity of the flapping axes to the hub-mast rotation axis allows the weight of lobes 3 to be reduced while at the same time ensuring a low stress level consistent with good fatigue strength of the lobes. This arrangement also reduces the driving loads in the rotor as a whole.

Further, the expanse which can be given to the skirts of caps 7 allows a maximum bearing surface and diameter to be given to the needle-bearings and their inner races 18 and 19, thereby reducing the pressures exerted.

Finally, the anti-coning stop provided by ring 48 and fingers 46 causes this flapping-free assembly to provide reciprocal and mutual action of the blades upon one another. The layout of these components at the top of the hub, in conjunction with a ring working in tension, result in advantages as to weight and cost of the hub without attendant trouble-some restrictions in the matter of overall dimensions. Further, the stresses resulting from the drag motions are limited by the flexibility imparted to the blades in their own plane, their natural vibration frequency being so chosen as to reduce the dynamic stresses to which they are intrinsically subjected.

The system thus provides a freedom of blade oscillation which is restricted only in the flapping mode, thereby averting the disadvantages arising with rigid rotors having tailed-in blade supports, such as rotor instability at high forward flight speeds and the high driving power required, or with rotors in which the blades have both flapping and drag hinges, which must be equipped with drag motion dampers and include numerous anti-friction bearings undergoing oscillatory motion, which bearings are loaded by centrifugal force and are prone to intensive grooving. The present invention provides a lighter and more economical design while at the same time retaining the advantages of low vibration level at high forward flight speeds, low stress levels in drag motion in the blades and the hub, and low flapping stresses in the hub itself.

Obviously, many changes and substitutions of parts could be made in the dispositions hereinbefore described for exemplary purposes, without departing from the scope of the invention.

What I claim is:

1. A rotor for rotary-wing aircraft, said rotor being limited to articulation in flap and pitch modes wherein drag movements induced in flight by the flapping of rotor blades connected to the rotor are elastically facilitated responsive to the flexibility of the rotor blades in their planes; said rotor comprising a hollow one-piece hub and rotor mast, the rotor being characterized by said rotor mast having its upper end portion widening into a sealed chamber forming said hub, blade attachment members integrally formed with said hub and extending outwardly thereof, said attachment members being adapted to receive the interconnecting means of said rotor blades, said attachment members comprising spaced double lobes disposed in planes parallel to the rotational axis of said rotor, said double lobes forming yokes equal in number to the number of said rotor blades, the ends of said interconnecting means received in said yokes being shaped to constitute flapping hinges and being formed by shoulder portions of a stub-axle member upon which a sleeve comprising a blade attachment is rotatably restrained, anti-friction thrust bearings and anti-friction pivotal-motion bearings being located in pairs in cap members urged together from the exterior through the bores of said lobes, the ends of the shoulder portions being included between said bearings, and a spacer member extending through said shoulder portions, said cap members being in turn clamped from the exterior by internal abutment against the ends of said spacer member.

2. A rotor as claimed in claim 1, wherein a hollow spacer member forms a lubricant reservoir and feed means for oil-tight seals between cap members and bearings, between bearings and shoulder portions and between bearings and spacer member.

3. A rotor as claimed in claim 1, wherein indirect elastic means are interposed between said thrust bearing and the end of the shoulder portion on one side thereof.

4. A rotor as claimed in claim 1, wherein each stub-axle member shoulder portion has formed thereon an upper finger cooperating mechanically with the inside of a rigid ring working in tension and the action of which is reciprocal and mutual upon all the blade attachment members, said ring being freely movable at the top of the rotor hub between the upper surfaces of the lobes and related restraining members fixed to the top of the hub, and furthermore, said shoulder portions having formed thereon at their lower ends facets which cooperate by abutment against thrust surface provided on the bottom of the yoke formed by the corresponding lobes, which cooperation limits the amplitude of the flapping motion.

* * * * *